United States Patent
Shen et al.

(10) Patent No.: US 11,012,488 B2
(45) Date of Patent: May 18, 2021

(54) CONTENT STREAMING REDUNDANCY ARCHITECTURE

(71) Applicant: Verizon Patent and Licensing Inc., Arlington, VA (US)

(72) Inventors: Kevin Shen, Sunnyvale, CA (US); Suri B. Medapati, San Jose, CA (US); Caleb Chaney, Fort Worth, TX (US); George So, San Jose, CA (US); Yinqing Zhao, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 15/840,951

(22) Filed: Dec. 13, 2017

(65) Prior Publication Data

US 2019/0182305 A1   Jun. 13, 2019

(51) Int. Cl.
*H04L 29/06* (2006.01)
*H04N 21/231* (2011.01)
*H04N 21/845* (2011.01)
*H04N 21/24* (2011.01)
*H04N 21/2665* (2011.01)

(Continued)

(52) U.S. Cl.
CPC ........ *H04L 65/607* (2013.01); *H04L 65/4084* (2013.01); *H04L 65/601* (2013.01); *H04L 65/605* (2013.01); *H04N 21/23103* (2013.01); *H04N 21/23106* (2013.01); *H04N 21/2404* (2013.01); *H04N 21/8456* (2013.01); *H04N 21/2187* (2013.01); *H04N 21/2665* (2013.01); *H04N 21/6143* (2013.01)

(58) Field of Classification Search
CPC ............ H04N 21/8456; H04N 21/222; H04N 21/64707; H04N 19/30; H04N 21/23116; H04N 21/2187; H04N 21/6143; H04N 21/23106; H04N 21/2665; H04L 65/60; H04L 65/602; H04L 67/10; H04L 67/28; H04L 67/2842; H04L 65/605; H04L 65/80; H04L 41/0668; H04L 69/40; H04L 65/607; H04L 65/601; H04L 65/4084
See application file for complete search history.

(56) References Cited

U.S. PATENT DOCUMENTS

| | | | |
|---|---|---|---|
| 6,687,846 B1 * | 2/2004 | Adrangi | G06F 11/0709 714/17 |
| 8,977,766 B2 * | 3/2015 | Peters | H04L 67/1008 709/231 |

(Continued)

*Primary Examiner* — Dhairya A Patel
*Assistant Examiner* — Alex H. Tran

(57) ABSTRACT

A system can include multiple content ingress sites to process content into portions of content. A content ingress site, of the multiple content ingress sites, can include a first set of devices. The first set of devices can be configured to process the content in a synchronized manner. The first set of devices can be configured to have excess processing capacity to facilitate failover of a first segmenter device to a second segmenter device. The first set of devices can be configured to process content from multiple sources. The system can include multiple content distribution sites to encode the portions of content. A content distribution site can include a second set of devices. The system can include multiple content satellite offices to provide the portions of content to one or more destination devices. A content satellite office can include a third set of devices.

20 Claims, 5 Drawing Sheets

(51) Int. Cl.
*H04N 21/61* (2011.01)
*H04N 21/2187* (2011.01)

(56) References Cited

U.S. PATENT DOCUMENTS

| | | | | |
|---|---|---|---|---|
| 10,177,965 | B1* | 1/2019 | Joshi | H04L 41/0668 |
| 2009/0157850 | A1* | 6/2009 | Gagliardi | G06F 16/958 |
| | | | | 709/219 |
| 2009/0248787 | A1* | 10/2009 | Sivasubramanian | |
| | | | | H04L 29/08729 |
| | | | | 709/201 |
| 2010/0095012 | A1* | 4/2010 | Zuckerman | H04L 67/1097 |
| | | | | 709/231 |
| 2010/0095013 | A1* | 4/2010 | Zuckerman | H04L 67/1002 |
| | | | | 709/231 |
| 2010/0235528 | A1* | 9/2010 | Bocharov | H04L 65/4092 |
| | | | | 709/231 |
| 2011/0083037 | A1* | 4/2011 | Bocharov | H04L 65/4069 |
| | | | | 714/4.11 |
| 2011/0087794 | A1* | 4/2011 | Li | H04N 21/84 |
| | | | | 709/231 |
| 2011/0107379 | A1* | 5/2011 | Lajoie | H04L 65/1016 |
| | | | | 725/87 |
| 2012/0290876 | A1* | 11/2012 | Nortz | H04W 72/0446 |
| | | | | 714/15 |
| 2014/0143437 | A1* | 5/2014 | Mathur | H04N 21/8456 |
| | | | | 709/231 |
| 2014/0189765 | A1* | 7/2014 | Green | H04N 21/2365 |
| | | | | 725/110 |
| 2014/0269776 | A1* | 9/2014 | Bomfim | H04N 21/23608 |
| | | | | 370/503 |
| 2015/0088890 | A1* | 3/2015 | Hoffert | G06F 16/24553 |
| | | | | 707/737 |
| 2015/0281746 | A1* | 10/2015 | Lam | H04N 21/231 |
| | | | | 725/116 |
| 2015/0312302 | A1* | 10/2015 | Gupta | H04L 65/80 |
| | | | | 709/219 |
| 2017/0048536 | A1* | 2/2017 | Forehand | H04N 21/2404 |
| 2017/0055007 | A1* | 2/2017 | Phillips | H04N 21/2353 |
| 2017/0188054 | A1* | 6/2017 | Ma | H04L 67/02 |
| 2017/0329791 | A1* | 11/2017 | Manchester | H04N 21/84 |
| 2019/0036763 | A1* | 1/2019 | Sauer | H04N 21/23106 |
| 2019/0082238 | A1* | 3/2019 | Sengupta | H04N 21/2393 |
| 2019/0166178 | A1* | 5/2019 | Beheydt | H04L 65/607 |

* cited by examiner

CONTENT STREAMING REDUNDANCY ARCHITECTURE

BACKGROUND

Streaming media (e.g., video streaming) involves delivering content and continually presenting the content to an end-user. A media stream can be either "live" or "on demand." In live streaming, content is provided to a destination device without saving the content (e.g., using memory resources). In on demand streaming (e.g., video on demand streaming), content can be saved prior to being provided to a destination device.

DETAILED DESCRIPTION OF PREFERRED EMBODIMENTS

Figure 1:
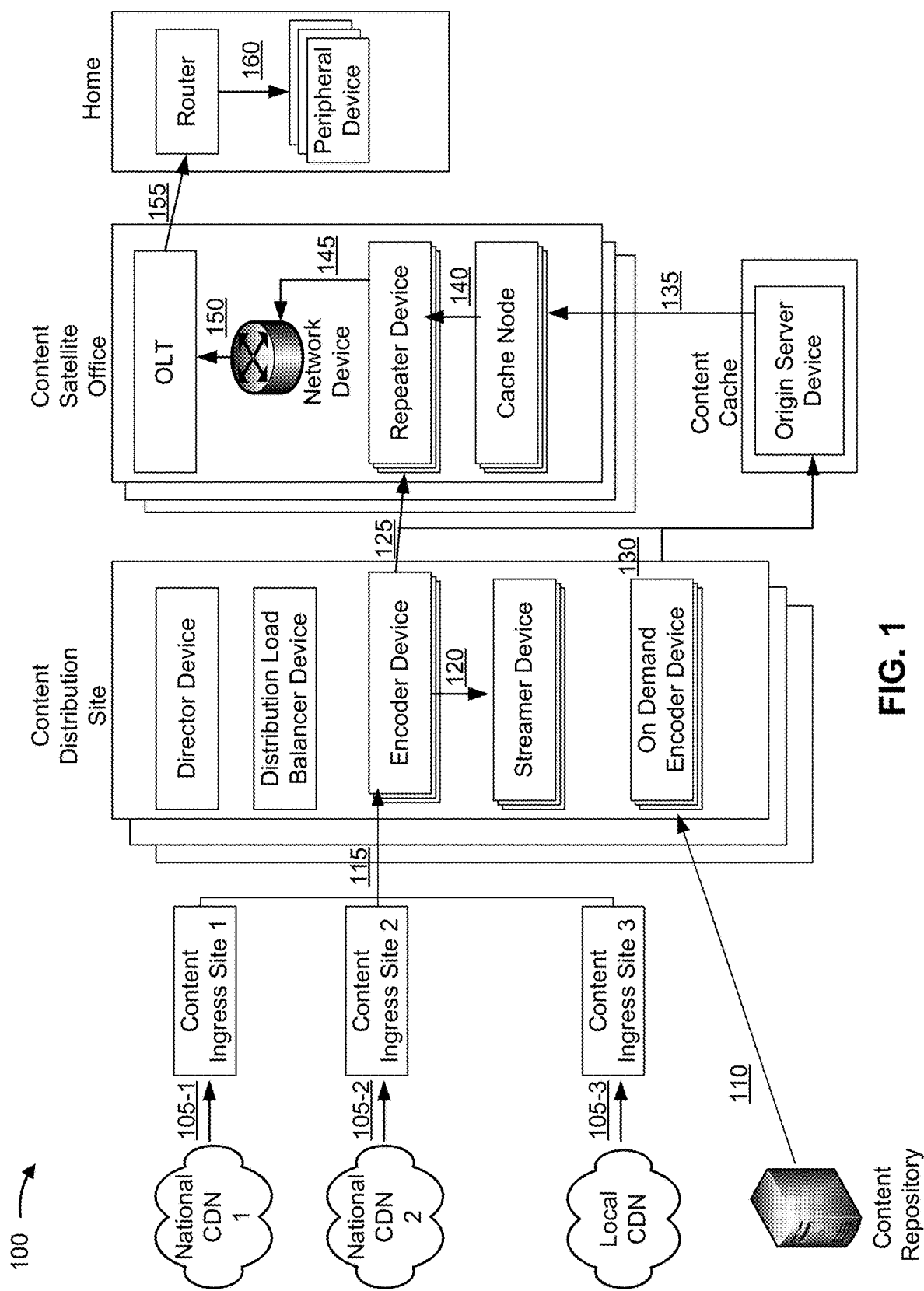
FIG. 1 is a diagram of an overview of an example implementation described herein.

The following detailed description of example implementations refers to the accompanying drawings. The same reference numbers in different drawings can identify the same or similar elements.

To deliver content from a source, such as a satellite or an antenna, to a destination, such as a user device or a set-top box, the content might need to be re-encoded at a different bit rate. In addition, the content might need to be segmented into chunks. When providing the content to a destination, the quality of the content that is delivered to the destination can be negatively impacted by dropped packets, interference between the source of the content and the destination of the content, errors with hardware and/or software of the source, the destination, and/or devices between the source and destination, connectivity issues between the source and destination, and/or the like.

Some systems that provide content from a source to a destination can include some redundancy and/or failover functions to reduce errors related to content being provided to a destination. However, to provide redundancy, these systems might need complete redundancy (e.g., due to devices of these systems being dedicated to processing content from a particular source). For example, for each device used to provide content from a source to a destination, a spare device would need to be present to provide system redundancy. In addition, these systems can be configured to retry failed processes, such as encoding and/or delivery processes, which increases latency when providing content to a destination, thereby negatively impacting a quality of content provided to a destination. Further, these systems might not be configured to fail over automatically to spare devices and/or systems, thereby increasing latency related to recovery of the system.

Some implementations, described herein, provide a system (e.g., a content delivery system, a data center, etc.) related to providing content that includes multiple content ingress sites and/or multiple content distribution sites that can process content from different sources and/or that can parallel process content from the same or different sources. For example, devices of the system might not be dedicated to a particular source, can have excess processing capacity to process content from multiple sources, and/or the like. In this way, the system provides redundancy without needing complete redundancy of all devices of the system (e.g., via use of devices that are not dedicated to a source, via use of excess capacity of devices, etc.). In addition, in this way, the system can provide process redundancy in real-time or near real-time via parallel processing of content. This reduces a quantity of devices needed in the system to provide device redundancy. In addition, this reduces or eliminates a need for the system to retry failed processes, thereby reducing or eliminating latency in delivering content that would otherwise result from a failed process. Further, this improves a quality of content provided to a destination through faster recovery and/or failover of the system.

FIG. 1 is a diagram of an overview of an example implementation 100 described herein. As shown in FIG. 1, example implementation 100 can include multiple content delivery networks (CDNs) (e.g., shown as national CDN 1, national CDN 2, and a local CDN), multiple content ingress sites (e.g., shown as content ingress sites 1 through 3), a content repository, multiple content distribution sites, multiple content satellite offices, a content cache, and a home to which the content is to be delivered. A content distribution site (of the multiple content distribution sites) can include a director device, a distribution load balancer device, encoder devices, streamer devices, and video on demand (VOD) encoder devices. A content satellite office (of the multiple content satellite offices) can include repeater devices, cache nodes, a network device, and an optical line terminal (OLT). In some implementations, the content cache can include an origin server device. In some implementations, the home can include various devices, such as a router and one or more peripheral devices (e.g., a user device, a television, a set-top box, etc.).

As further shown in FIG. 1, and by reference numbers 105-1 through 105-3, the content delivery networks can provide content (e.g., live content) to the content ingress sites. For example, as shown by reference number 105-1, national CDN 1 can provide national content to content ingress site 1. Similarly, as shown by reference number 105-2, national CDN 2 can provide national content to content ingress site 2, and as shown by reference number 105-3, the local CDN can provide local content to content ingress site 3.

Content ingress sites 1 through 3 can process the content into portions, segments, chunks, and/or the like (e.g., of a particular length for video content and/or audio content). When processing content, a content ingress site can be configured such that multiple devices of the content ingress site process the same content at the same time, or about the same time (e.g., the multiple devices can process the content in parallel and/or in a synchronized manner). The content ingress site can then select processed content from one of the devices to provide to a content distribution site and can store the processed content from another of the multiple devices (e.g., so that the processed content can be provided to a content distribution site to replace lost content, damaged content, content that includes an error, etc.), thereby reducing or eliminating a need to reprocess content. In addition, this reduces latency related to replacing lost or damaged content (e.g., relative to re-processing the content). The content distribution sites, the content satellite offices, and/or the like can be configured to process content in a similar manner.

Further, the system shown in FIG. 1 can be configured such that a disruption to content provided for display via the peripheral devices does not cause an immediate disruption to the content being displayed by a device (e.g., via use of cached content, buffered content, etc.). In this way, when content being provided for display experiences an error, the system can replace the content prior to the error disrupting the display of the content. This improves a manner in which content is provided for display, improves a user experience, and/or the like.

Content ingress sites 1 through 3 might not be dedicated to a source of content. For example, content ingress site 1 might not be dedicated to receiving content from national CDN 1. In addition, each of content ingress sites 1 through 3 can be configured to have excess capacity for receiving and/or processing content. In this way, a first content ingress site can fail over to a second content ingress site (e.g., rather than failing over to a dedicated backup content ingress site). This reduces a need for complete redundancy of content ingress sites (e.g., where each content ingress site has a dedicated backup). In addition, this facilitates parallel processing by content ingress sites (and/or devices associated with a content ingress site), thereby facilitating faster recovery and/or failover (e.g., relative to retrying a process in the event of a failure or an error). As shown by reference number 110, the content repository can provide other content (e.g., on demand content) to the content distribution site (e.g., to on demand encoder devices associated with the content distribution site).

As further shown in FIG. 1, and as shown by reference number 115, the content ingress sites can provide content received from the CDNs (e.g., live content) to the content distribution sites (e.g., to the encoder devices associated with the content distribution sites). In some implementations, the director device (of a particular content distribution site) can use the distribution load balancer device (of the particular content distribution site) to manage what content is provided to which encoder device within the particular content distribution site. This prevents any one encoder device from becoming overloaded and reduces latency related to processing the content (e.g., relative to the content not being load balanced among the encoder devices). In addition, the use of multiple encoder devices with excess processing capacity, permits the director device to fail over processing by a first encoder device to a second encoder device without a need for complete redundancy of encoder devices. This reduces a quantity of devices needed to provide fail over services for encoder devices of a content distribution site by reducing or eliminating a need for a content distribution site to have a dedicated backup encoder device for each encoder device.

As shown by reference number 120, after the encoder devices have encoded content, the encoder devices (e.g., of a particular content distribution site) can provide the content to the streamer devices (e.g., of the particular content distribution site). For example, the encoder devices can encode video content according to a video compression standard, such as H.264, H.265, and/or the like (e.g., can encode segments of content).

As shown by reference number 125, the streamer devices can provide content to the content satellite offices (e.g., to the repeater devices associated with a content satellite office) and/or to the content cache (e.g., to the origin server device associated with the content cache). As shown by reference number 130, the on demand encoder devices, upon receiving content from the content repository) can provide content to the content satellite offices (e.g., to the repeater devices associated with the content satellite offices) and/or to the content cache (e.g., to the origin server device). In some implementations, the on demand encoder devices can encode content from the content repository in a manner similar to that described above with the encoder devices.

A content distribution site might not be dedicated to a content ingress site. In addition, a content distribution site (or devices of the content distribution site) can be configured with excess capacity for receiving and/or processing content. This facilitates failover among content distribution sites, reduces a quantity of backup content distribution sites (or devices thereof) needed, facilitates parallel processing by content distribution sites (or devices thereof), and/or the like, similar to that described elsewhere herein. For example, a first content distribution site can fail over to a second content distribution site, a first encoder device can fail over to a second encoder device (e.g., associated with the same or a different content distribution site), and/or the like. Additionally, or alternatively, a content distribution site (or devices thereof) can automatically fail over an error-containing process without retrying the error-containing process, thereby reducing latency related to providing content when a process of a content distribution site (or a device thereof) experiences an error and/or conserving processing resources related to retrying an error-containing process.

As shown by reference number 135, the content cache (e.g., the origin server device associated with the content cache) can provide stored content to the content satellite offices (e.g., to the cache nodes associated with the content satellite offices). For example, the origin server device can provide content to a cache node of the cache nodes upon a request for the content from the cache notes, at a pre-determined time, and/or the like. The cache nodes can store the content for a particular amount of time, until requested by the peripheral devices, and/or the like. As shown by reference number 140, the cache nodes (e.g., of a particular content satellite office) can provide the content to the repeater devices (e.g., of the particular content satellite office). In some implementations, the cache nodes can provide the content to the repeater devices based on a request for the content from the repeater devices, at a pre-determined time, and/or the like.

As further shown in FIG. 1, and as shown by reference number 145, the repeater devices (e.g., of a particular content satellite office), based on receiving content from the streamer devices of the content distribution site and/or from the cache nodes, can provide the content to the network device (e.g., of the particular satellite office). For example, the repeater devices can provide the content to the network device for delivery to the peripheral devices. As shown by reference number 150, the network device (e.g., of a particular content satellite office) can provide the content to the OLT (e.g., of the particular satellite office). The network device can identify, to the OLT, a destination (e.g., a home, a peripheral device, etc.) to which the content is destined.

Content satellite offices might not be dedicated to content distribution sites. In addition, the content satellite offices (or devices of the content satellite offices) can be configured with excess capacity for receiving and/or processing content. This facilitates failover among content satellite offices (or devices thereof), reduces a quantity of backup content satellite offices (or devices thereof) needed, facilitates parallel processing, and/or the like, similar to that described elsewhere herein.

As shown by reference number 155, the OLT can provide the content to the home (e.g., to a router in the home). As shown by reference number 160, the router can provide the content to various peripheral devices communicatively coupled to the router. For example, the router can provide the content to a user device (e.g., a mobile phone, a tablet, etc.). Additionally, or alternatively, the router can provide the content to a television (e.g., an Internet protocol (IP) television). Additionally, or alternatively, the router can provide the content to a set-top box. In some implementations, the peripheral devices can provide the content for display via various displays associated with the peripheral devices.

In this way, some implementations described herein facilitate failover while minimizing interruption to content delivery. Furthermore, implementations described herein facilitate failover in real-time or near real-time via use of parallel processing. Further, in this way, some implementations described herein, eliminate a need for complete redundancy of a system architecture by configuring devices to have excess processing capacity that can be used for failover. Furthermore, by having devices configured with excess processing capacity, the devices can process the same content simultaneously. In this way, some implementations described herein can facilitate failover to a device that has already processed the content. This reduces or eliminates a need for a device to retry a process if a process of the device fails, thereby conserving processing resources of the device, reducing latency in delivering content to a destination associated with failover, and/or the like.

As indicated above, FIG. 1 is provided merely as an example. Other examples are possible and can differ from what was described with regard to FIG. 1.

Figure 2:
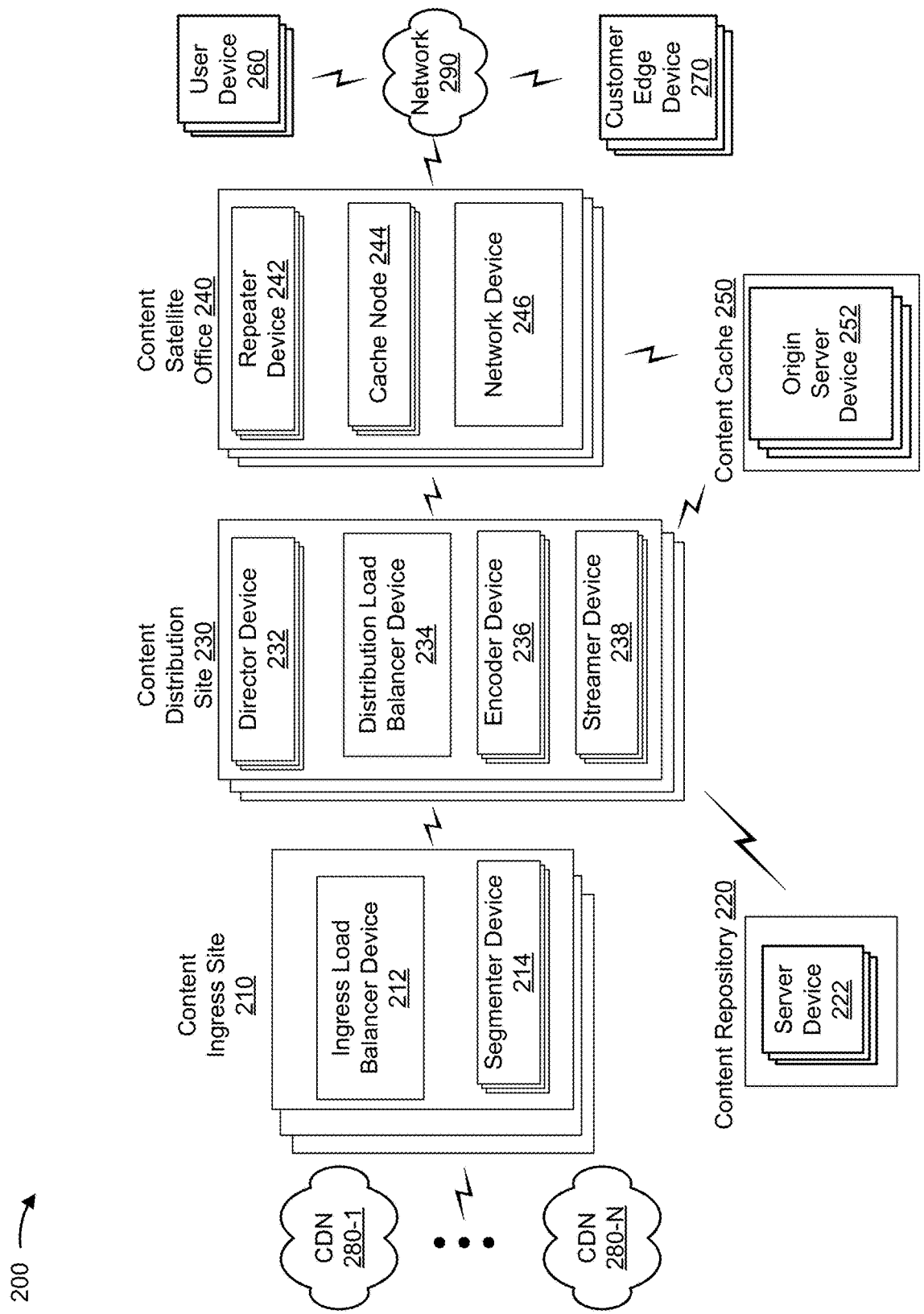
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a content ingress site 210 that includes an ingress load balancer device 212 and a set of segmenter devices 214 (referred to collectively as "segmenter devices 214" and individually as "segmenter device 214"). Additionally, or alternatively, environment 200 can include a content repository 220 that includes a set of server devices 222 (referred to collectively as "server devices 222" and individually as "server device 222"). Additionally, or alternatively, environment 200 can include a content distribution site 230 that includes a set of director devices 232 (referred to collectively as "director devices 232" and individually as "director device 232"), a distribution load balancer device 234, a set of encoder devices 236 (referred to collectively as "encoder devices 236" and individually as "encoder device 236"), and a set of streamer devices 238 (referred to collectively as "streamer devices 238" and individually as "streamer device 238"). Additionally, or alternatively, environment 200 can include a content satellite office 240 that includes a set of repeater devices 242 (referred to collectively as "repeater devices 242" and individually as "repeater device 242"), a set of cache nodes 244 (referred to collectively as "cache nodes 244" and individually as "cache node 244"), and a network device 246. Additionally, or alternatively, environment 200 can include a content cache 250 that includes a set of origin server devices 252 (referred to collectively as "origin server devices 252" and individually as "origin server device 252"). Additionally, or alternatively, environment 200 can include a set of user devices 260 (referred to collectively as "user devices 260" and individually as "user device 260"), a set of customer edge devices 270 (referred to collectively as "customer edge devices 270" and individually as "customer edge device 270"), CDNs 280-1 through 280-N(N≥1), and a network 290. Devices of environment 200 can interconnect via wired connections, wireless connections, or a combination of wired and wireless connections.

Content ingress site 210 includes one or more sites and/or systems capable of receiving, generating, storing, processing, and/or providing content from CDN 280 (e.g., content to be provided to user device 260 and/or customer edge device 270). For example, content ingress site 210 can include a headend, a cable television headend, a super headend (SHE), a market center headend, a video hub office (VHO), an antenna, a satellite dish, a data center, and/or the like. In some implementations, content ingress site 210 can receive content from CDN 280 that is to be provided to user device 260 and/or customer edge device 270. Additionally, or alternatively, content ingress site 210 can process content received from CDN 280 into portions (e.g., prior to providing the content toward user device 260 and/or customer edge device 270).

Ingress load balancer device 212 includes one or more devices capable of load balancing processing of content by one or more other devices of content ingress site 210. For example, ingress load balancer device 212 can include a load balancer, server device 222, and/or the like. In some implementations, ingress load balancer device 212 can receive, from segmenter devices 214, information related to processing of content by segmenter devices 214. Additionally, or alternatively, ingress load balancer device 212 can load balance processing of content among segmenter devices 214 (e.g., to prevent segmenter devices 214 from being overloaded, to fail over processing of content from a first segmenter device 214 to a second segmenter device 214, etc.).

Segmenter device 214 includes one or more devices capable of receiving, processing, providing, generating, and/or storing content received from CDN 280. For example, segmenter device 214 can include a segmenter, server device 222, and/or the like. In some implementations, segmenter device 214 can process content from CDN 280 into segments, portions, chunks, and/or the like (e.g., of a particular length for video content and/or audio content). Additionally, or alternatively, segmenter device 214 can provide processed content (e.g., chunks of content) to content distribution site 230 after processing the content.

Content repository 220 includes one or more sites and/or devices capable of receiving, providing, generating, processing, and/or storing content (e.g., on demand content, such as on demand video content). For example, content repository 220 can include a data center, a data warehouse, a set of server devices 222, and/or the like. In some implementations, content repository 220 can store content to be provided to user device 260 and/or customer edge device 270 (e.g., on demand content). Additionally, or alternatively, content repository 220 can provide content to content distribution site 230 based on receiving a request for the content, at a pre-determined time, and/or the like.

Server device 222 includes one or more devices capable of receiving, providing, storing, processing, and/or generating content (e.g., on demand content). For example, server device 222 can include a server (e.g., in a data center or a cloud computing environment), a data center (e.g., a multi-server micro data center), a workstation computer, a virtual machine (VM) provided in a cloud computing environment, or a similar type of device. In some implementations, server device 222 can include a communication interface that allows server device 222 to receive information from and/or transmit information to another device in environment 200. In some implementations, server device 222 can store content to be provided to user device 260 and/or customer edge device 270. Additionally, or alternatively, server device 222 can provide, to content distribution site 230, content stored by server device 222.

Content distribution site 230 includes one or more sites and/or devices capable of receiving, providing, storing, processing, and/or generating content. For example, content distribution site 230 can include a content point of distribution, a market center headend, a data center, and/or the like. In some implementations, content distribution site 230 can receive content from content ingress site 210 and/or content repository 220 (e.g., segments of content) and can encode the content. Additionally, or alternatively, content distribution site 230 can provide the content (e.g., encoded content) to content satellite office 240 and/or content cache 250.

Director device 232 includes one or more devices capable of managing operations of one or more other devices of content distribution site 230. For example, director device 232 can include a director, server device 222, and/or the like. In some implementations, director device 232 can provide, to one or more other devices of content distribution site 230, instructions related to processing (e.g., encoding) content from content ingress site 210 and/or content repository 220. Additionally, or alternatively, director device 232 can cause processing of content to fail over among devices of content distribution site 230 and/or among content distribution sites 230 (e.g., by providing a set of instructions to cause the failover).

Distribution load balancer device 234 includes one or more devices capable of load balancing processing of content by one or more other devices of content distribution site 230. For example, distribution load balancer device 234 can include a load balancer, server device 222, and/or the like. In some implementations, distribution load balancer device 234 can receive, from encoder devices 236 and/or streamer devices 238, information related to processing of content by encoder devices 236 and/or streamer devices 238. Additionally, or alternatively, distribution load balancer device 234 can load balance processing of content among encoder devices 236 and/or streamer devices 238 (e.g., to prevent encoder devices 236 and/or streamer devices 238 from being overloaded, to fail over processing of content from a first encoder device 236 and/or streamer device 238 to a second encoder device 236 and/or streamer device 238, etc.).

Encoder device 236 includes one or more devices capable of processing content. For example, encoder device 236 can include an encoder, an on demand content encoder, server device 222, and/or the like. In some implementations, encoder device 236 can encode content from content ingress site 210 (e.g., chunks of content). Additionally, or alternatively, encoder device 236 can provide content to streamer device 238 after processing the content.

Streamer device 238 includes one or more devices capable of providing content to one or more other devices. For example, streamer device 238 can include a streamer, server device 222, and/or the like. In some implementations, streamer device 238 can provide (e.g., stream) content to content satellite office 240 to facilitate providing of the content to user device 260 and/or customer edge device 270. Additionally, or alternatively, streamer device 238 can provide content to content cache 250 (e.g., for storage by origin server device 252).

Content satellite office 240 includes one or more sites and/or devices capable of providing content toward a destination (e.g., user device 260 and/or customer edge device 270). For example, content satellite office 240 can include a video satellite office, a hub, a data center, and/or the like. In some implementations, content satellite office 240 can be located in a geographic region and can receive content destined for homes in the same geographic region as content satellite office 240. Additionally, or alternatively, content satellite office 240 can provide, to one or more homes, content received from content distribution site 230 and/or content cache 250.

Repeater device 242 includes one or more devices capable of receiving, providing, storing, generating, and/or processing content to be provided to user device 260 and/or customer edge device 270. For example, repeater device 242 can include a repeater, a transceiver (or separate transmitter and receiver), an amplifier, server device 222, and/or a similar type of device. In some implementations, repeater device 242 can receive content from content satellite office 240 and/or content cache 250. Additionally, or alternatively, repeater device 242 can perform an action related to recovering lost content (e.g., due to packet loss, interference, etc.), lookback recording, inserting advertisements into content (e.g., ad splicing), multicast re-streaming, and/or the like.

Cache node 244 includes one or more devices capable of receiving, providing, storing, generating, and/or processing content to be provided to user device 260 and/or customer edge device 270. For example, cache node 244 can include a cache, an edge cache node, server device 222, and/or the like. In some implementations, cache node 244 can store content, from content distribution site 230 and/or content cache 250, for an amount of time (e.g., to reduce latency between a request for the content from user device 260 and/or customer edge device 270 and delivery of the content to user device 260 and/or customer edge device 270). Additionally, or alternatively, cache node 244 can store content to facilitate various content-related services for user device 260 and/or customer edge device 270, such as restart services (e.g., where a user of user device 260 and/or customer edge device 270 can restart live and/or on demand content), lookback services (e.g., where a user of user device 260 and/or customer edge device 270 can time-shift content from a scheduled time to another time), replay services (e.g., where a user of user device 260 and/or customer edge device 270 can replay previously aired content), and/or the like.

Network device 246 includes one or more devices (e.g., one or more traffic transfer devices) capable of receiving, providing, generating, storing, and/or processing information related to content provided to user device 260 and/or customer edge device 270. For example, network device 246 can include a firewall, a router, a gateway, a switch, a hub, a bridge, a reverse proxy, a server (e.g., a proxy server), a security device, an intrusion detection device, a load balancer, and/or a similar device. In some implementations, network device 246 can receive content to be delivered to user device 260 and/or customer edge device 270 (e.g., from cache node 244 and/or repeater device 242). Additionally, or alternatively, network device 246 can provide content toward user device 260 and/or customer edge device 270 (e.g., via an OLT associated with content satellite office 240, a network terminal, such as an optical network terminal (ONT) associated with a home, etc.).

Content cache 250 includes one or more sites and/or devices capable of receiving, providing, storing, generating, and/or processing content to be provided to user device 260 and/or customer edge device 270. For example, content cache 250 can include a data center (e.g., in a cloud computing environment), a data warehouse, a set of server devices 222, a set of origin server devices 252, and/or the like. In some implementations, content cache 250 can receive content from content distribution site 230. Additionally, or alternatively, content cache 250 can store content (e.g., on demand content) for an amount of time to reduce latency between a request for the content from user device 260 and/or customer edge device 270 and delivery of the content to user device 260 and/or customer edge device 270.

Origin server device 252 includes one or more devices capable of receiving, providing, storing, processing, and/or generating information related to content to be provided to user device 260 and/or customer edge device 270. For example, origin server device 252 can include server devices 222, a storage device, a content origin server, and/or the like. In some implementations, origin server device 252 can receive, from streamer device 238, content to be provided to user device 260 and/or customer edge device 270. Additionally, or alternatively, origin server device 252 can store content to be provided to user device 260 and/or customer edge device 270 and/or can provide the content to cache node 244.

User device 260 includes one or more devices capable of receiving, generating, providing, storing, and/or processing content. For example, user device 260 can include a desktop computer, a mobile phone (e.g., a smartphone, a radio telephone, etc.), a laptop computer, a tablet computer, a handheld computer, a gaming device, a wearable communication device (e.g., a smart wristwatch, a pair of smart eyeglasses, etc.), or a similar device. In some implementations, user device 260 can receive content from content satellite office 240 (e.g., via network 290). Additionally, or alternatively, user device 260 can provide content for output (e.g., via an output component associated with user device 260).

Customer edge device 270 includes one or more devices capable of receiving, generating, storing, processing, and/or providing content. For example, customer edge device 270 can include a set-top box, a television (e.g., an IP television), a projector, a modem, a smart speaker, an intelligent personal assistant device, and/or a similar device. In some implementations, customer edge device 270 can receive content from content satellite office 240 (e.g., via network 290). Additionally, or alternatively, customer edge device 270 can provide content for output (e.g., via an output component of customer edge device 270).

CDN 280 includes one or more wired and/or wireless networks. For example, CDN 280 can include a content delivery network, a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, CDN 280 can provide content to content ingress site 210.

Network 290 includes one or more wired and/or wireless networks. For example, network 290 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

In some implementations, one or more devices of environment 200 can be implemented as a virtual device (e.g., hosted on another device). Additionally, or alternatively, one or more devices of environment 200 can be implemented as physical device (e.g., on a rack of a data center).

Figure 3:
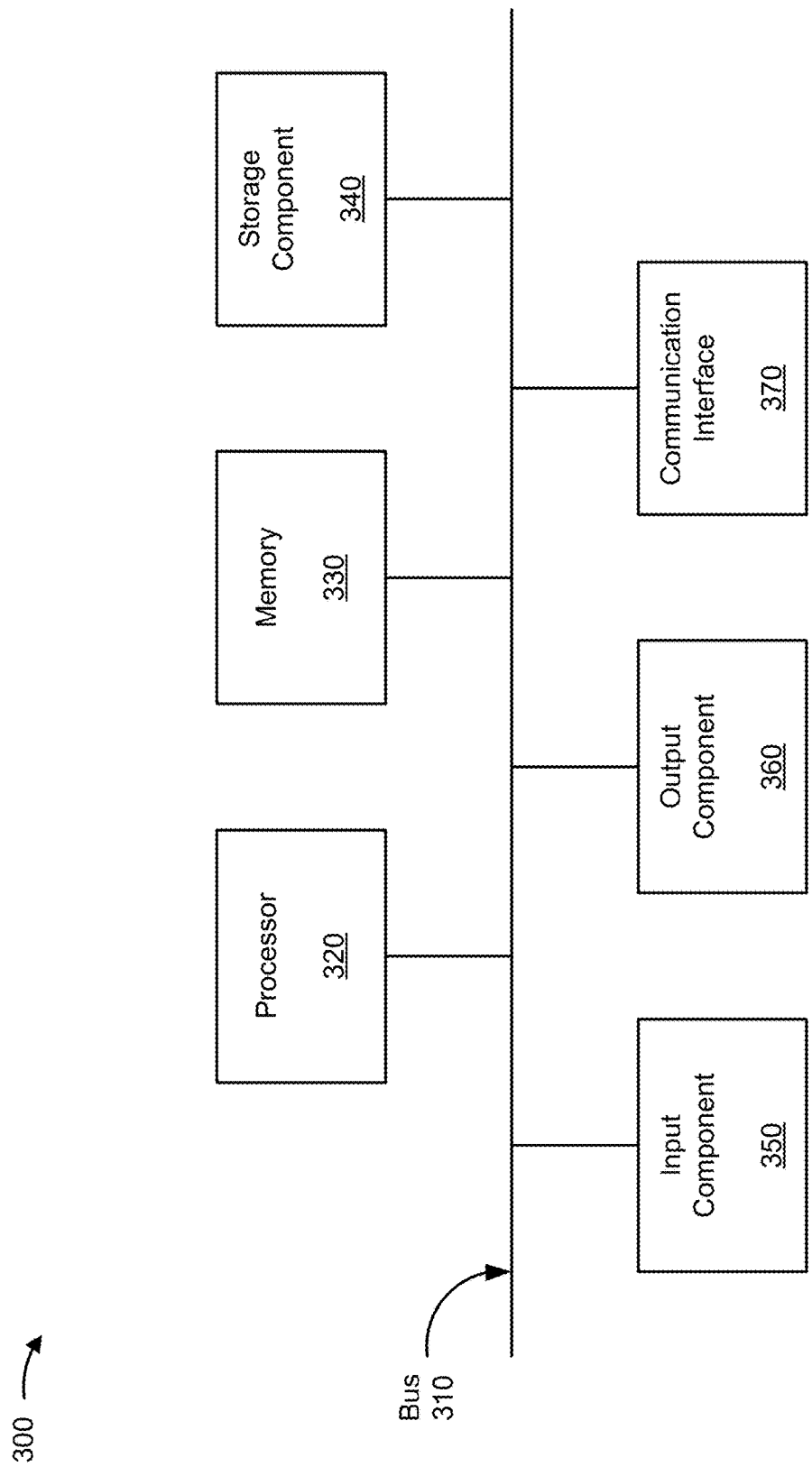
FIG. 3 is a diagram of example components of one or more devices of FIG. 2.

FIG. 3 is a diagram of example components of a device 300. Device 300 can correspond to content ingress site 210, ingress load balancer device 212, segmenter device 214, content repository 220, server device 222, content distribution site 230, director device 232, distribution load balancer device 234, encoder device 236, streamer device 238, content satellite office 240, repeater device 242, cache node 244, network device 246, content cache 250, origin server device 252, user device 260, and/or customer edge device 270. In some implementations, content ingress site 210, ingress load balancer device 212, segmenter device 214, content repository 220, server device 222, content distribution site 230, director device 232, distribution load balancer device 234, encoder device 236, streamer device 238, content satellite office 240, repeater device 242, cache node 244, network device 246, content cache 250, origin server device 252, user device 260, and/or customer edge device 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
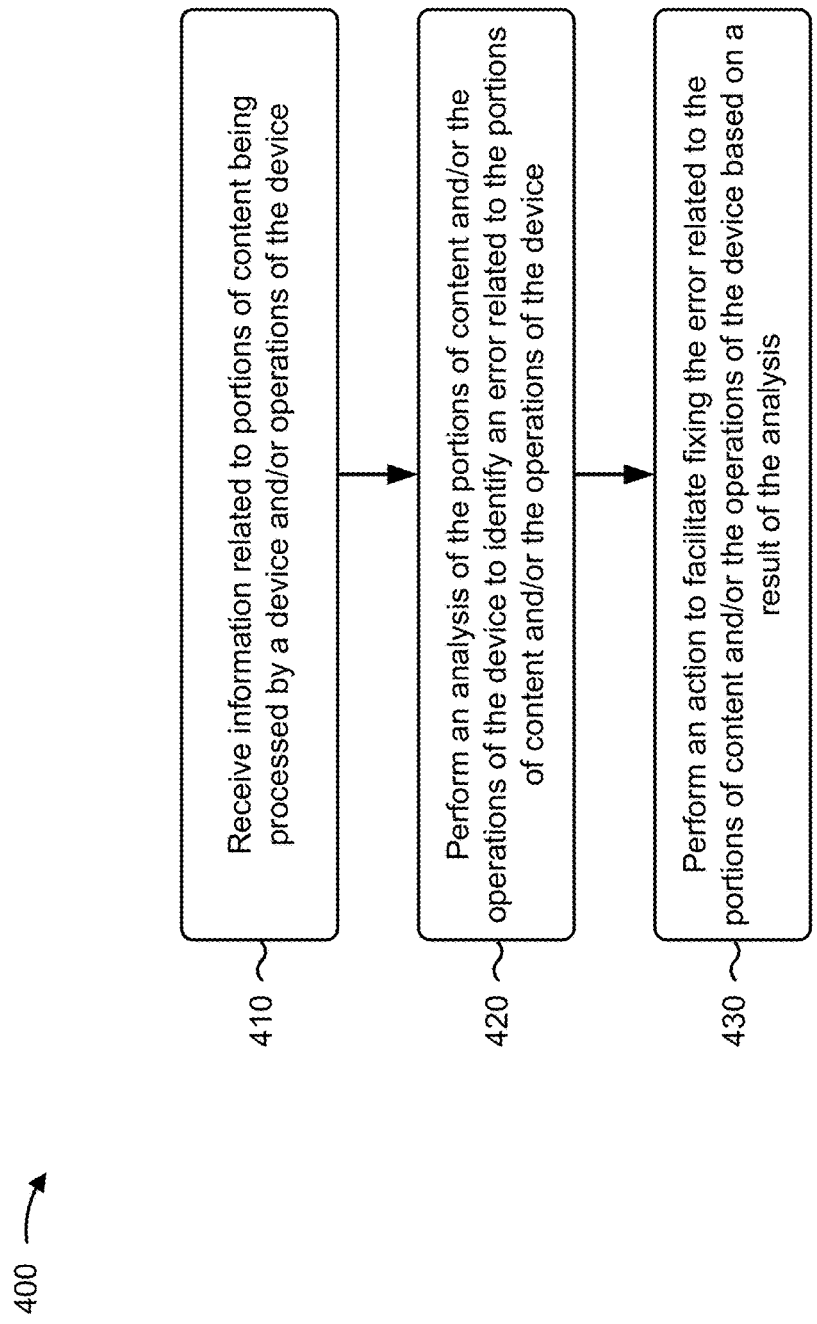
FIG. 4 is a flow chart of an example process related to content streaming redundancy architecture.

FIG. 4 is a flow chart of an example process 400 related to content streaming redundancy architecture. For example, FIG. 4 shows an example process for performing an action to fix an error related to content and/or operations of a device. In some implementations, one or more process blocks of FIG. 4 can be performed by content distribution site 230. In some implementations, one or more process blocks of FIG. 4 can be performed by another device or a group of devices separate from or including content distribution site 230, such as content ingress site 210, ingress load balancer device 212, segmenter device 214, content repository 220, server device 222, director device 232, distribution load balancer device 234, encoder device 236, streamer device 238, content satellite office 240, repeater device 242, cache node 244, network device 246, content cache 250, origin server device 252, user device 260, and/or customer edge device 270.

As shown in FIG. 4, process 400 can include receiving information related to portions of content being processed by a device and/or operations of the device (block 410). For example, content distribution site 230 (e.g., director device 232 of content distribution site 230) can receive the information. In some implementations, content distribution site 230 can receive the information from encoder device 236, streamer device 238, and/or repeater device 242. In some implementations, content distribution site 230 can receive the information based on requesting the information, as another device processes content, according to a schedule, periodically, and/or the like.

In some implementations, content can include video, audio, text, an image, and/or the like. In some implementations, content can include live content (e.g., live video, provided in real-time or near real-time), content on demand (e.g., video on demand), and/or the like. In some implementations, content can include one or more packets. In some implementations, a packet can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via CDN 280 and/or network 290. In some implementations, a portion of content can include a segment, a chunk, and/or the like.

In some implementations, the information can identify content that is being processed. Additionally, or alternatively, the information can identify segments of content that are generated from the content. Additionally, or alternatively, the information can identify packets that are provided toward user device 260 and/or customer edge device 270. Additionally, or alternatively, the information can identify packets that are received by repeater device 242 and/or a destination device (e.g., user device 260 and/or customer edge device 270).

In this way, content distribution site 230 can receive information related to portions of content and/or operations of a device to facilitate an analysis of the portions of content and/or the operations of the device.

As further shown in FIG. 4, process 400 can include performing an analysis of the portions of content and/or the operations of the device to identify an error related to the portions of content and/or the operations of the device (block 420). For example, content distribution site 230 (e.g., director device 232 of content distribution site 230) can perform an analysis. In some implementations, content distribution site 230 can perform an analysis as content distribution site 230 receives information related to portions of content and/or operations of a device, based on receiving input to perform an analysis, and/or the like.

In some implementations, content distribution site 230 can perform an analysis of a quantity of portions and/or packets of content provided to and/or received by one or more devices. For example, content distribution site 230 can perform a comparison of a quantity of portions of content provided to repeater device 242 and a quantity of portions of content received by repeater device 242 to determine whether the quantities match. Continuing with the previous example, a mismatch between the quantities can indicate an error with a connection between content distribution site 230 and repeater device 242, an error with operations of repeater device 242, and/or the like (e.g., an error that results in a loss of portions of content, a loss of packets, etc.).

Additionally, or alternatively, and as another example, content distribution site 230 can perform a comparison of a quantity of packets provided to user device 260 and/or customer edge device 270 and a quantity of portions of packets received by user device 260 and/or customer edge device 270 to determine whether the quantities match. Continuing with the previous example, and similar to that described above, a mismatch between the quantities can indicate an error with a connection between a device and user device 260 and/or customer edge device 270, an error with user device 260 and/or customer edge device 270, and/or the like.

In some implementations, content distribution site 230 can perform an analysis of a quality of content provided for output via user device 260 and/or customer edge device 270. For example, content distribution site 230 can perform an analysis of an encoding of content provided toward user device 260, and an encoding of content provided for display by user device 260 and/or customer edge device 270, to determine whether the encoding matches an intended encoding, satisfies a threshold, and/or the like. For example, a mismatch between encodings can indicate an error with operations of content satellite office 240, user device 260, and/or customer edge device 270, an incorrect configuration of content satellite office 240, user device 260, and/or customer edge device 270, and/or the like. Additionally, or alternatively, and as another example, content distribution site 230 can perform, in a similar manner, an analysis of a bit rate of content provided for output, a resolution of content provided for output, an amount of noise present in content provided for output, and/or the like.

In some implementations, content distribution site 230 can perform an analysis of operations of encoder device 236. For example, content distribution site 230 can determine whether the correct encoder devices 236 are processing content (e.g., by performing a comparison of information identifying encoder devices 236 processing content and encoder devices 236 that were expected to process content), whether an amount of time for encoder device 236 to process content satisfies a threshold, and/or the like. Continuing with the previous example, a result of performing an analysis of operations of encoder device 236 can indicate whether an error with content (e.g., dropped packets, poor quality, etc.) is a result of operations of encoder device 236.

In some implementations, content distribution site 230 can perform an analysis of operations of streamer device 238. For example, content distribution site 230 can determine whether streamer device 238 is providing portions of content toward expected repeater devices 242 (e.g., by performing a comparison of information identifying repeater devices 242 toward which streamer device 238 is providing content and expected repeater devices 242 toward which streamer device 238 is to provide content), whether streamer device 238 is providing portions of content to repeater device 242 within a threshold amount of time of encoder device 236 encoding the portions of content, and/or the like. Continuing with the previous example, a result of performing an analysis of operations of streamer device 238 can indicate whether an error with content is a result of operations of streamer device 238 and/or repeater device 242.

In some implementations, content distribution site 230 can perform an analysis of operations of repeater device 242. For example, content distribution site 230 can determine whether repeater device 242 is providing portions of content to expected user devices 260 and/or expected customer edge devices 270 (e.g., using information that identifies user devices 260 and/or customer edge devices 270 to which repeater device 242 provided content and to which user devices 260 and/or customer edge devices 270 repeater device 242 was expected to provide content, which user devices 260 and/or customer edge devices 270 received content, etc.), whether repeater device 242 is providing portions of content within a threshold amount of time of receiving the portions of content from streamer device 238, and/or the like. Continuing with the previous example, a result of performing an analysis of operations of repeater device 242 can indicate whether an error associated with content is a result of operations of repeater device 242, a connection between repeater device 242 and another device, and/or the like.

In some implementations, content distribution site 230 can identify a source of an error. For example, content distribution site 230 can identify a device as a source of an error, a connection between two or more devices as a source of an error, and/or the like. In some implementations, content distribution site 230 can identify a source of an error based on a result of performing an analysis. For example, content distribution site 230 can identify a source of an error based on a result of an analysis related to a quantity of packets. In this case, if the quantity of packets provided toward user device 260 and/or customer edge device 270 and the quantity of packets received by user device 260 and/or customer edge device 270 do not match, content distribution site 230 can identify user device 260 and/or customer edge device 270 as the source of an error. In some implementations, if a quantity of packets provided by a device does not match an expected quantity of packets to be provided by the device, content distribution site 230 can identify the device that provided the packets as the source of an error.

Additionally, or alternatively, and as another example, content distribution site 230 can identify a source of an error based on quality of the content provided to a device. In this case, if the quality of the content provided to user device 260 and/or customer edge device 270 does not match an expected quality (e.g., based on identifying a threshold bit rate error in the content, a resolution of the content, etc.), content distribution site 230 can identify the device that provided the content as a source of the error.

In this way, content distribution site 230 can perform an analysis of the portions of content and/or the operations of a device to identify an error related to the portions of content and/or the operations of the device.

As further shown in FIG. 4, process 400 can include performing an action to facilitate fixing the error related to the portions of content and/or the operations of the device based on a result of the analysis (block 430). For example, content distribution site 230 (e.g., director device 232 of content distribution site 230) can perform an action to facilitate fixing the error related to the portions of content and/or the operations of the device based on a result of the analysis.

In some implementations, content distribution site 230 can perform an action to cause content to be processed by a different device in the same content distribution site 230 (e.g., a different encoder device 236 and/or streamer device 238). For example, content distribution site 230 can cause a first device associated with content distribution site 230 to fail over to a second device associated with content distribution site 230. Additionally, or alternatively, content distribution site 230 can perform an action to cause content to be processed by a different content distribution site 230. For example, content distribution site 230 can cause a first content distribution site 230 to fail over to a second content distribution site 230.

Additionally, or alternatively, content distribution site 230 can perform an action to power down devices of content distribution site 230. Additionally, or alternatively, content distribution site 230 can perform an action to power up additional devices of content distribution site 230. Additionally, or alternatively, content distribution site 230 can perform an action to send a message to user device 260 of a network administrator. For example, the message can identify an error associated with content and/or operations of a device, whether a first device has failed over to a second device, and/or the like. Additionally, or alternatively, content distribution site 230 can perform an action to generate a work ticket for a device (e.g., to fix an error). Additionally, or alternatively, content distribution site 230 can perform an action to cause portions of content to be provided to a destination via a different path or set of devices (e.g., to avoid a connection that is causing an error, to avoid a device that is causing an error, etc.).

In this way, content distribution site 230 can perform an action to facilitate fixing the error.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
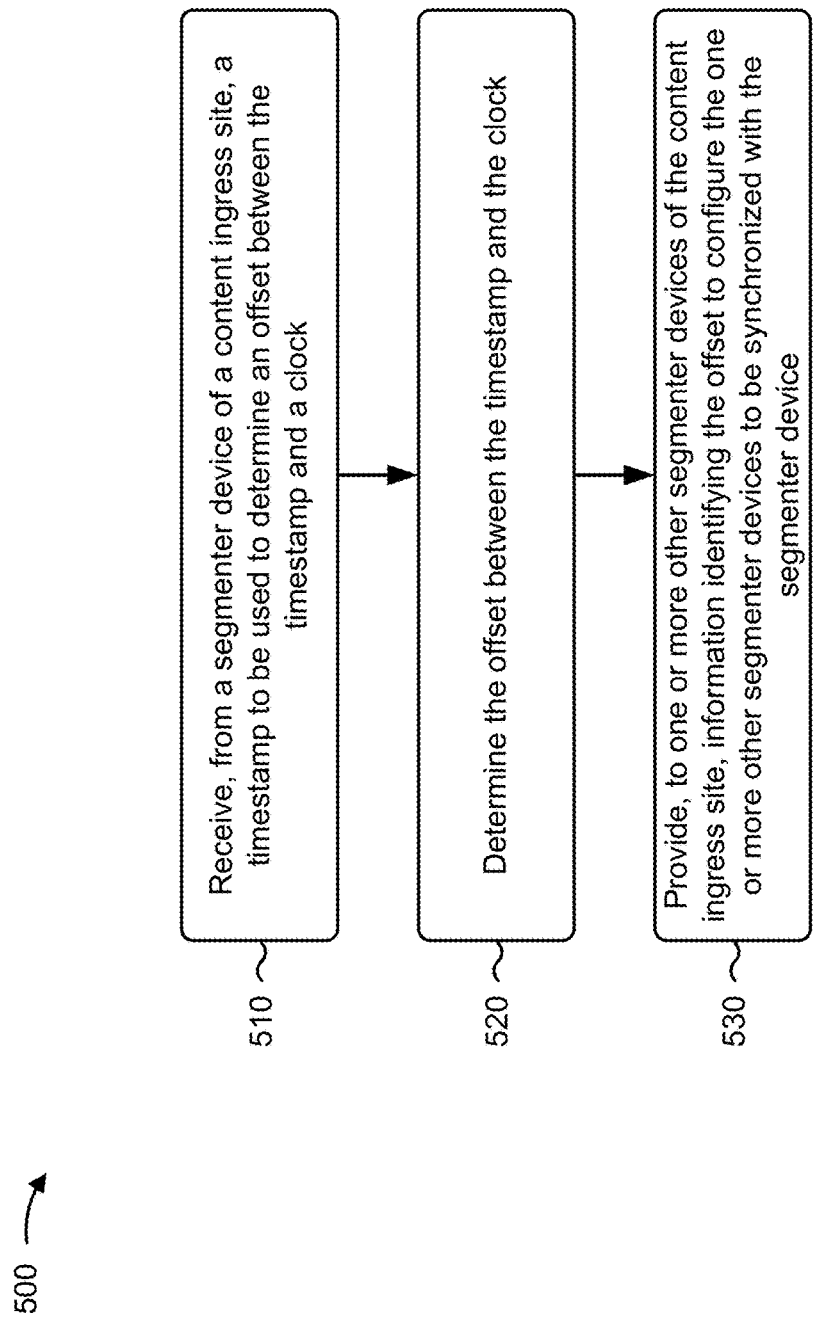
FIG. 5 is another flow chart of an example process related to content streaming redundancy architecture.

FIG. 5 is a flow chart of an example process 500 for content streaming redundancy architecture. For example, FIG. 5 shows an example of synchronizing segmenter devices 214 to process the same content at the same time (or about the same time). In some implementations, one or more process blocks of FIG. 5 can be performed by content distribution site 230. In some implementations, one or more process blocks of FIG. 5 can be performed by another device or a group of devices separate from or including content distribution site 230, such as content ingress site 210, ingress load balancer device 212, segmenter device 214, content repository 220, server device 222, director device 232, distribution load balancer device 234, encoder device 236, streamer device 238, content satellite office 240, repeater device 242, cache node 244, network device 246, content cache 250, origin server device 252, user device 260, and/or customer edge device 270.

As shown in FIG. 5, process 500 can include receiving, from a segmenter device of a content ingress site, a timestamp to be used to determine an offset between the timestamp and a clock (block 510). For example, content distribution site 230 (e.g., director device 232 of content distribution site 230) can receive a timestamp to be used to determine an offset between the timestamp and a clock (e.g., a clock of content distribution site 230). In some implementations, a timestamp can identify a time indicated by a clock of segmenter device 214.

In some implementations, content distribution site 230 can receive a timestamp from segmenter device 214 to facilitate synchronization of segmenter device 214 and one or more other segmenter devices 214. For example, content distribution site 230 can receive a timestamp to determine an offset (e.g., a difference) between a time identified by a timestamp from segmenter device 214 and a time identified by a clock of content distribution site 230.

In some implementations, content distribution site 230 can receive a timestamp when content ingress site 210 receives content to be provided to a destination, or when content ingress site 210 is brought on line. Additionally, or alternatively, and as other examples, content distribution site 230 can receive a timestamp periodically, according to a schedule, based on requesting a timestamp, and/or the like.

In this way, content distribution site 230 can receive a timestamp from segmenter device 214 prior to determining an offset between the timestamp and a clock.

As further shown in FIG. 5, process 500 can include determining the offset between the timestamp and the clock (block 520). For example, content distribution site 230 (e.g., director device 232 of content distribution site 230) can determine the offset between the timestamp and the clock. In some implementations, content distribution site 230 can determine an offset based on receiving a timestamp, based on receiving input to determine an offset, and/or the like.

In some implementations, content distribution site 230 can compare a time identified by a timestamp and a time identified by a clock of content distribution site 230 to determine an offset between the time identified by the timestamp and the time identified by the clock. For example, content distribution site 230 can determine a difference between the time identified by the timestamp and the time identified by the clock. In some implementations, content distribution site 230 can use a time identified by a clock of content distribution site 230 and a determined offset to synchronize one or more other segmenter devices 214 with segmenter device 214 from which a timestamp was received (e.g., by configuring clocks of the other segmenter devices 214 to have the same offset as segmenter device 214).

In this way, director device 232 can determine the offset between the timestamp and the clock.

As further shown in FIG. 5, process 500 can include providing, to one or more other segmenter devices of the content ingress site, information identifying the offset to configure the one or more other segmenter devices to be synchronized with the segmenter device (block 530). For example, content distribution site 230 (e.g., director device 232 of content distribution site 230) can provide the information to the one or more other segmenter devices 214.

In some implementations, content distribution site 230 can provide the information after determining the offset, based on the one or more other segmenter devices 214 requesting the information, based on receiving input to provide the information, according to a schedule, periodically, and/or the like. In some implementations, the information can be associated with configuring the one or more other segmenter devices 214 to be synchronized with segmenter device 214. For example, by identifying the offset and/or a current time of a clock associated with content distribution site 230, the information can cause operations of the one or more other segmenter devices 214 and segmenter device 214 to be performed at the same time. Continuing with the previous example, providing the information can cause the one or more other segmenter devices 214 to segment content into the same portions as segmenter device 214, at the same time as segmenter device 214, and/or the like. This facilitates seamless and automatic failover from segmenter device 214 to one of the one or more other segmenter device s 214.

In this way, content distribution site 230 can provide information identifying the offset to one or more other segmenter devices 214 to configure the one or more other segmenter devices 214 to be synchronized with segmenter device 214.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Some implementations, described herein, provide a system related to providing content to a destination that includes multiple content ingress sites 210 and/or multiple content distribution sites 230 with excess processing capacity and that are not dedicated to a source of content. In this way, the system provides redundancy without needing complete redundancy of all devices of the system. In addition, in this way, devices of the system can be synchronized to perform processes at the same time (or about the same time). This permits the system to provide process redundancy in real-time or near real-time without the need for dedicated backup devices. In addition, this reduces a quantity of devices needed in the system to provide device redundancy, thereby reducing or eliminating a need to retry an error-containing process. Further, this facilitates automatic failover, thereby reducing latency associated with failover and/or conserving processing resources that would otherwise be consumed retrying an error-containing process.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
multiple content ingress devices to process content, received from multiple sources, into portions of the content,
a first content ingress device, of the multiple content ingress devices, including a first set of processors that includes:
multiple segmenter processors, and
at least one ingress load balancer processor to load balance processing of the content among the multiple segmenter processors,
the multiple segmenter processors being configured to:
process the content in a synchronized manner, and
have excess processing capacity to facilitate failover of a first segmenter processor, of the multiple segmenter processors, to a second segmenter processor of the multiple segmenter processors, and
the first content ingress device being configured to fail over to a second content ingress device of the multiple content ingress devices,
the second content ingress device and the first content ingress device being associated with processing the content from different sources of the multiple sources;
multiple content distribution devices to encode the portions of the content,
a content distribution device, of the multiple content distribution devices, including a second set of processors that includes:
at least one director processor to manage first operations associated with one or more other processors of the second set of processors, and
multiple encoder processors,
where the multiple encoder processors are not dedicated backup encoder processors for each other, and
the content distribution device being configured to:
perform an analysis of an encoding of the portions of the content to identify an error related to the encoding of the portions of the content,
wherein the analysis includes comparing a quantity of portions of content provided to repeater devices and a quantity of portions of content received by repeater devices to determine whether the quantities match, indicate, based on performing the analysis, whether the error is a result of second operations associated with a first encoder processor of the multiple encoder processors, and cause, based on the error being the result of the second operations, a particular portion of the content corresponding to the first encoder processor to be processed by a second encoder processor of the multiple encoder processors; and multiple content satellite devices to provide the portions of the content to one or more destination devices.

2. The system of claim 1, where the first segmenter processor and the second segmenter processor are associated with different sources of the multiple sources.

3. The system of claim 1, where the first segmenter processor and the second segmenter processor are configured to process a same portion of the content at a same time.

4. The system of claim 1, where the content distribution device further includes multiple streamer processors; and
where the content distribution device is further configured to:
encode the portions of the content via the multiple encoder processors, and
provide the portions of the content to the multiple content satellite devices via the multiple streamer processors.

5. The system of claim 1, where a content satellite device, of the multiple content satellite devices, includes:
multiple repeater processors;
at least one network processor; and
where the content satellite device is configured to:
provide the portions of the content to the one or more destination devices via the multiple repeater processors and the at least one network processor.

6. The system of claim 1, further comprising:
a content repository,
the content repository including at least one server device, and
the content repository being configured to provide other content, stored by the at least one server device, to the multiple content distribution devices; and
a content cache,
the content cache including at least one origin server device, and
the content cache being configured to store, in the at least one origin server device, the portions of the content from the multiple content distribution devices prior to providing the portions of the content to the multiple content satellite devices.

7. The system of claim 1, where the at least one director processor is configured to:
receive, from the first segmenter processor, a timestamp that identifies a time of a first clock associated with the first segmenter processor,
the timestamp to be used to determine an offset between the timestamp and a second clock associated with the at least one director processor;
determine the offset between the timestamp and the second clock; and
provide, to the second segmenter processor, information identifying the offset to synchronize the first segmenter processor and the second segmenter processor.

8. A content delivery system, comprising:
multiple content ingress devices to process content, received from multiple sources, into portions of the content,
a first content ingress device, of the multiple content ingress devices, including a first set of processors that includes:
multiple segmenter processors, and
at least one ingress load balancer processor to load balance processing of the content among the multiple segmenter processors,
the multiple segmenter processors being configured to:
process the content in a synchronized manner, and
have excess processing capacity to facilitate failover of a first segmenter processor, of the multiple segmenter processors, to a second segmenter processor of the multiple segmenter processors, and
the first content ingress device being configured to fail over to a second content ingress device of the multiple content ingress devices,
the second content ingress device and the first content ingress device being associated with processing the content from different sources of the multiple sources;
multiple content distribution devices to encode the portions of the content,
a content distribution device, of the multiple content distribution devices, including a second set of processors that includes:
at least one director processor to manage first operations associated with one or more other processors of the second set of processors, and
multiple encoder processors configured to have excess processing capacity to process the portions of the content to facilitate failover among the multiple encoder processors,
where the multiple encoder processors are not dedicated backup encoder processors for each other, and
the content distribution device being configured to:
perform an analysis of an encoding of the portions of the content to identify an error related to the encoding of the portions of the content,
wherein the analysis includes comparing a quantity of portions of content provided to repeater devices and a quantity of portions of content received by repeater devices to determine whether the quantities match,
indicate, based on performing the analysis, whether the error is a result of second operations associated with a first encoder processor of the multiple encoder processors, and
cause, based on the error being the result of the second operations, a particular portion of the content corresponding to the first encoder processor to be processed by a second encoder processor of the multiple encoder processors; and
multiple content satellite devices to provide the portions of the content to one or more destination devices.

9. The content delivery system of claim 8, where the first encoder processor is configured to process same portions of the content at a same time as the second encoder processor.

10. The content delivery system of claim 8, where the at least one director processor is configured to:
perform an action to facilitate fixing the error.

11. The content delivery system of claim 8, where the at least one director processor is configured to:

receive, from the first segmenter processor, a timestamp that identifies a time of a first clock associated with the first segmenter processor,
the timestamp to be used to determine an offset between the timestamp and a second clock associated with the at least one director processor;
determine the offset between the timestamp and the second clock; and
provide, to the second segmenter processor, information identifying the offset to synchronize the first segmenter processor and the second segmenter processor.

12. The content delivery system of claim 8, where the content distribution device further includes multiple streamer processors; and
where the multiple encoder processors and the multiple streamer processors are not dedicated to a particular source of the multiple sources.

13. The content delivery system of claim 8, where a first content distribution device, of the multiple content distribution devices, is configured to:
fail over to a second content distribution device of the multiple content distribution devices.

14. The content delivery system of claim 8, where the content distribution device is further configured to:
determine at least one of:
whether a correct encoder device is processing the particular portion of the content, by comparing information identifying the encoder device processing the particular portion of the content and information identifying an encoder device that was expected to process the content, or
whether an amount of time for the first encoder processor to process the particular portion of the content satisfies a threshold; and
where the content distribution device, when indicating whether the error is the result of the second operations associated with the first encoder processor, is configured to:
indicate whether the error is the result of the second operations associated with the first encoder processor based on whether the amount of time for the first encoder processor to process the particular portion of the content satisfies the threshold.

15. A data center, comprising:
multiple content ingress devices to process content, received from multiple sources, into portions of the content,
a first content ingress device, of the multiple content ingress devices, including a first set of processors that includes:
multiple segmenter processors, and
at least one ingress load balancer processor to load balance processing of the content among the multiple segmenter processors,
the multiple segmenter processors being configured to:
process the content in a synchronized manner, and
have excess processing capacity to facilitate failover of a first segmenter processor, of the multiple segmenter processors, to a second segmenter processor, of the multiple segmenter processors, and
the first content ingress device being configured to fail over to a second content ingress device of the multiple content ingress devices,
the second content ingress device and the first content ingress device being associated with processing the content from different sources of the multiple sources;
multiple content distribution devices to encode the portions of the content,
a content distribution device, of the multiple content distribution devices, including a second set of processors that includes:
at least one director processor to manage first operations associated with one or more other processors of the second set of processors, and
multiple encoder processors,
where the multiple encoder processors are not dedicated backup encoder processors for each other, and
the content distribution device being configured to:
perform an analysis of an encoding of the portions of the content to identify an error related to the encoding of the portions of the content,
wherein the analysis includes comparing a quantity of portions of content provided to repeater devices and a quantity of portions of content received by repeater devices to determine whether the quantities match,
indicate, based on performing the analysis, whether the error is a result of second operations associated with a first encoder processor of the multiple encoder processors, and
cause, based on the error being the result of the second operations, a particular portion of the content corresponding to the first encoder processor to be processed by a second encoder processor of the multiple encoder processors;
multiple content satellite devices to provide the portions of the content to one or more destination devices,
a content satellite device, of the multiple content satellite devices, including a third set of processors that includes multiple repeater processors;
a content repository to provide other content to the content distribution device,
the content repository including at least one server device; and
a content cache to store the content or the other content from the content distribution device or to provide the content or the other content to a content satellite device of the multiple content satellite devices,
the content cache including:
at least one origin server device.

16. The data center of claim 15,
where a first repeater processor, of the multiple repeater processors, is configured to:
fail over to a second repeater processor of the multiple repeater processors,
the first repeater processor and the second repeater processor being associated with a same content distribution device.

17. The data center of claim 15, where the at least one director processor is configured to:
perform an action to facilitate fixing the error.

18. The data center of claim 15, where the at least one director processor is configured to:
synchronize two or more of the multiple segmenter processors to process a same portion of the content at a same time.

19. The data center of claim 15, where the content distribution device is configured to:

provide first portions of the content processed by the first encoder processor or second portions of the content processed by the second encoder processor,
the first portions of the content and the second portions of the content being same portions of the content.

20. The data center of claim 15, where the content satellite device is configured to:
provide the portions of the content to the one or more destination devices via the multiple repeater processors and an optical line terminal associated with the content satellite device.

* * * * *